Dec. 23, 1969     K. H. BRECH     3,485,087
ULTRASONIC INSPECTION APPARATUS
Filed Jan. 27, 1966     3 Sheets-Sheet 1
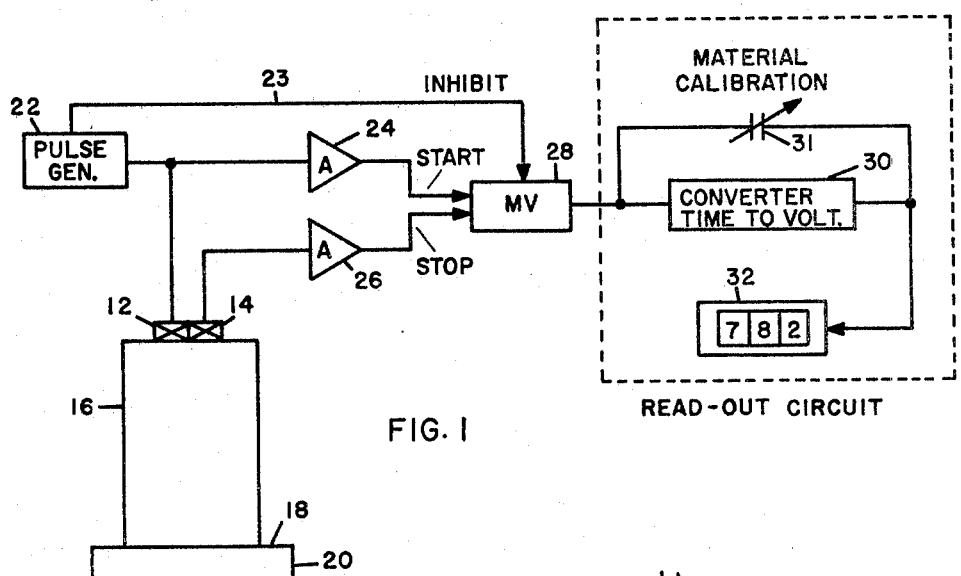
FIG. 1
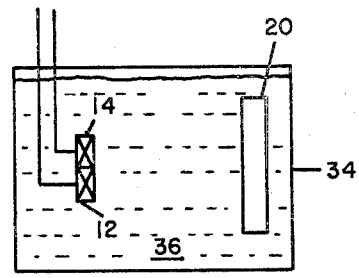
FIG. 2
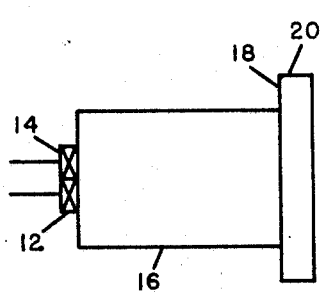
FIG. 3
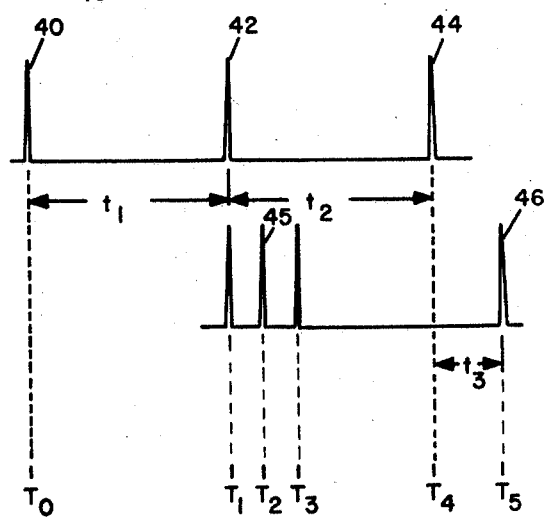
INVENTOR.
KILIAN H. BRECH
BY United States Patent Office 3,485,087
Patented Dec. 23, 1969

3,485,087
ULTRASONIC INSPECTION APPARATUS
Kilian H. Brech, Norwalk, Conn., assignor to Branson Instruments, Inc., Stamford, Conn., a corporation of Delaware
Continuation-in-part of application Ser. No. 493,080, Oct. 5, 1965. This application Jan. 27, 1966, Ser. No. 532,037
Int. Cl. G01n 9/24
U.S. Cl. 73—67.7
12 Claims

ABSTRACT OF THE DISCLOSURE

In a pulse-echo ultrasonic apparatus a dual transducer comprising a transmitter transducer and a receiver transducer is coupled by means of coupling means to one side of an object. The transmitter transducer periodically sends an ultrasonic pulse through the coupling means into the object. A timing means is connected to both transducers to measure the time interval between a first echo received by said transmitter transducer and a subsequent echo by said receiver transducer, whereby the first echo is responsive to the pulse encountering the interface between the coupling means and the object surface and the subsequent echo being responsive to a change in acoustic impedance within the object as encountered by said pulse while being propagated in the object. The transit time of the signals through the coupling means is excluded from the indicated measurement.

---

This application for Letters Patent is a continuation-in-part application of copending application for U.S. Letters Patent Ser. No. 493,080, filed on Oct. 5, 1965, now abandoned.

This invention concerns the ultrasonic inspection of materials by propagating ultrasonic pulses therein and indicating on a read-out device the presence of reflections resulting from the ultrasonic pulses encountering a change in acoustic impedance. More particularly, this invention relates to an improved arrangement for measuring the thickness of objects or for detecting flaws when such objects exhibit a heavily corroded surface or are hot. Quite specifically, the present disclosure concerns ultrasonic means for determining with great accuracy the thickness of plates, pipes, bars etc. where only one surface is available and such surface is too hot for direct contact by an electro-acoustic transducer.

When exploring hot objects or objects having a heavily corroded surface with ultrasonic energy pulses various problems are encountered as are all well known to those skilled in the art. These problems concern primarily the difficulties of establishing good acoustic contact with the object surface, receiving well defined reflection signals, and achieving thermal insulation between the electro-acoustic transducer and the object surface. Some of these problems are mitigated by interposing a solid or a liquid coupling means between the electro-acoustic transducer and the object surface. However, the physical contact of the coupling means with a heated object under test causes a change in the acoustic delay properties of the coupling means and, thus, a steady drift manifests itself in the read-out circuit. This instability necessitates a constant recalibration of the circuit arrangement and is particularly annoying when taking measurements on critical wall thickness. Any drifts or instability is most noticeable when digital read-out circuits are in use.

In order to overcome these shortcomings, multiple echo measuring systems have been devised wherein measurements are made between some pre-selected echo signals. For instance, a measurement of the elapsed time between the third and the fourth echo insures that only the transit time of the acoustic signal through the object is measured even though an acoustic delay means is interposed between the object and the transducer and such delay means is subject to variations in its acoustic properties. In this case, the readings are not affected by changes in the delay means. The deficiency of this system resides, however, in the fact that on corroded surfaces it is difficult to obtain more than one reflection signal from the rear surface of the object and frequently such subsequent signal cannot be obtained at all.

The present invention eliminates the heretofore stated disadvantages by employing a pair of electro-acoustic transducers which are coupled to the object to be explored by means of an ultrasonic coupling means, the latter acting as a thermal insulation medium and also as an acoustic delay. The measuring circuit is arranged so that a first reflection signal, which is responsive to a change in acoustic impedance at a location substantially at the interface between the delay means and the object under test, is received by one of the transducers, while a subsequent reflection signal, occurring in response to a change in impedance encountered by the ultrasonic pulse traversing the object under test, is received by the other transducer. The transmitted pulse and the reflection responsive signals traverse equal distances through the interposed coupling means. The circuit provided is arranged to cause the transit time of the acoustic signals through the coupling means to be cancelled and, hence, the time interval between the receipt of the consecutive reflection signals by the transducers is a measure of the transit time of the ultrasonic pulse within the object. When exploring the thickness of an object, this time corresponds to two times the thickness of such object.

Any change in the thermal properties of the delay means automatically is cancelled, as is any change in the physical length of the delay means due to mechanical wear. The result of this arrangement is an indicating circuit which is extremely stable, free of drift, and completely unaffected by a change in the coupling medium due to mechanical or thermal variations. Additionally, the arrangement involving two transducers is extremely reliable when measuring objects which exhibit heavily corroded surfaces.

One of the principal objects of this invention is, therefore, the provision of an improved apparatus for exploring an object with the ultrasonic pulse-echo method.

Another important object of this invention is the provision of an improved thickness gauge using ultrasonic pulses which are applied to one side of the article to be measured.

Another object of this invention is the provision of an apparatus for accurately checking for the presence of flaws and determining the thickness of hot objects.

Another object of this invention is the provision of an ultrasonic exploring circuit using the pulse-echo system, such system being characterized by extreme accuracy and stability.

A further object of this invention is the provision of an apparatus for providing an ultrasonic exploring circuit in conjunction with a digital read-out circuit, the arrangement being characterized by stability and the absence of drift normally caused by thermal or physical changes in the coupling medium.

Further and still other objects of this invention will be more clearly apparent by reference to the following description when taken in conjunction with the accompanying drawings in which:

FIGURE 1 is a schematic block diagram of the preferred embodiment;

FIGURE 2 illustrates an alternative coupling medium;

FIGURE 3 is a schematic representation of the signals versus time;

Figure 4:
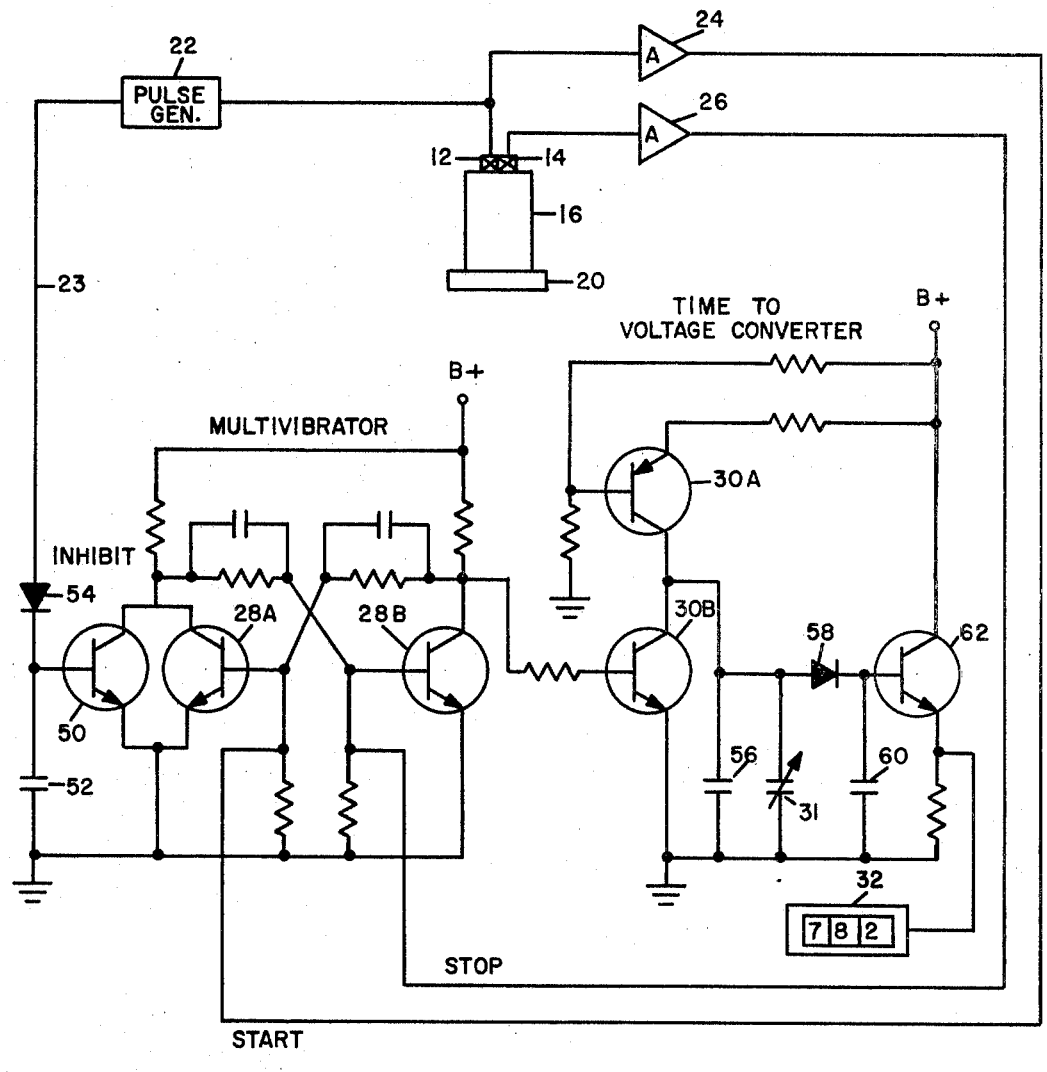
FIGURE 4 is a schematic electrical circuit diagram.

Referring now to the figures and FIGURE 1 in particular, numerals 12 and 14 identify a pair of electro-acoustic transducers which are coupled by means of a coupling medium 16 to the front surface 18 of an object 20 which is to be explored by ultrasonic energy. The transducers, made of piezoelectric material, are in side-by-side relation and may be enclosed in a single transducer housing. Also, the transducers may be focused, that is, positioned relative to each other so that their respective sonic energy beams intersect at a point rearward of the object entrant surface 18. This focusing feature is especially advantageous when pulses are transmitted to and received from heavily corroded or scaly objects. The coupling means 16, in a typical case, is a plastic material, e.g. "Lucite" (methyl methacrylate) which acts as a thermal insulation as well as an acoustic delay. A relatively thin film of a suitable couplant may be interposed between the transducers 12 and 14 and the coupling means 16, and between the coupling means 16 and the object surface 18.

Particular attention must be paid that the coupling means interposed between both transducers and the object provides the same amount of acoustic delay. To this end, the coupling means may be a single piece of material, or comprise two pieces of equal length. When the transducers are not focused, two separate coupling means are preferred, or even necessary, in order to avoid cross-coupling of signals. This may be accomplished by providing a longitudinal slot in the coupling means 16, one section being associated then with the transducer 12 and the other section with the transducer 14. The coupling means and the transducers 12 and 14 may be fastened together to provide a unitary structural assembly.

A pulse generator 22 which periodically generates a train of high frequency electrical pulses is connected to the transmitter transducer 12 which, in accordance with the novel principle of this disclosure, acts also as receiver transducer for the first echo or reflection signal. In response to the receipt of an electrical pulse signal, the transmitter transducer 12 propagates an ultrasonic pulse through the coupling means 16 toward and into the object 20. A pulse amplifier 24 is coupled to the transducer 12 and a similar amplifier 26 is coupled to the receiver transmitter 14. A bistable multivibrator 28, coupled to the output of the amplifiers 24 and 26, constitutes a typical timing circuit for measuring the time interval between the receipt of two consecutive reflection signals, also known as "echoes." This time interval is rendered discernible by means of a read-out circuit comprising a time-to-voltage converter circuit 30, a material calibration capacitor 31 to adjust for the difference of speed of sound in different materials, and a digital voltmeter 32. Alternatively, a cathode ray tube may be used.

Operation of this circuit may be visualized as follows:

The pulse generator 22 provides periodically a high frequency pulse to the transducer 12. The transducer causes the electrical energy to be changed to mechanical energy and propagates a compressional wave energy pulse of ultrasonic frequency toward the object 20. Concurrently with the generation of a pulse by the generator 22, an inhibit signal is transmitted from the pulse generator 22 via the conductor 23 to the multivibrator 28 to inhibit operation of the timing circuit at this instant. As the ultrasonic pulse from the transducer 12 traverses the coupling medium 16, it encounters the interface between the coupling medium 16 and the object front surface 18. The change in specific acoustic impedance at this interface produces a reflection signal which is sensed by the transducer 12.

The reflection signal received by the transducer 12 is amplified by the amplifier 24 and starts operation of the multivibrator 28. As the initial ultrasonic pulse propagates in the object 20, it encounters a change in acoustic impedance, either a flaw or the rear surface of the object. This change in impedance causes a second reflection which passes through the coupling means 16 and is sensed by the second transducer 14, is amplified by the amplifier 26 and is used to stop operation of the multivibrator 28. The time-to-voltage converter circuit 30, connected to the multivibrator 28, translates the period during which the multivibrator is actuated to a peak voltage which is displayed on the instrument 32, for instance a digital voltmeter. The voltmeter, therefore, indicates a value which is a measure of the distance the ultrasonic pulse has traveled in the object 20 from the entrant surface 18 to a change in acoustic impedance, either a flaw or the rear surface. An adjustable capacitor 31 connected in parallel with the time-to-voltage converter 30 calibrates the read-out circuit for various materials since the ultrasonic energy is propagated through different materials at different speeds. The read-out circuit may be made to read directly in thickness of material. Quite obviously, other timing means may be used to determine the time interval between both reflection signals, such as an oscillator and a frequency counter, without deviating from the principle of the arrangement indicated hereinabove.

In FIGURE 2 the object to be tested is disposed in a tank 34 which is filled with a liquid 36, such as water. The liquid interposed between transducers 12 and 14 and the object 20 serves as the coupling medium. Similarly, a so-called water bubbler may be used to provide the coupling between the transducers and the workpiece.

The timing of the different events is schematically indicated in FIGURE 3. The pulse 40 represents the initial pulse from the transducer 12 occurring at time $T_0$. This pulse travels through the coupling means 16 to the interface between the object 20 and the coupling medium. This interface causes a reflection signal 42 which is not immediately sensed by the transducer 12 but must traverse back through the coupling means 16 to provide a signal 44 at the transducer 12. The transit time $t_1$ of the signal from the transducer 12 to the object surface 18 equals the transit time $t_2$, the time during which the reflection signal 42 from the object surface retraces the path through the coupling medium 16.

At the time $T_1$ the initial pulse 40 enters the object 20, the pulse reaching the rear surface of the object at the time $T_2$. The resulting reflection reaches the front surface 18 of the object 20 at the time $T_3$. The reflection signal then is propagated through the coupling means 16 to the transducer 14, reaching it at the time $T_5$ and represented by the pulse 46. The time interval $t_3$, which is the time between $T_4$ and $T_5$, represents the elapsed time between the arrival of the reflection signal caused by the object surface 18 as sensed by the transducer 12 and the subsequent reflection signal caused by the ultrasonic pulse encountering a change in acoustic impedance as it reaches the rear surface of the object 20. This interval $t_3$ is proportional to twice the thickness of the object 20. As is apparent, the circuit cancels out the length of the coupling medium 16.

It may be noted that any change in the acoustic properties of the coupling medium 16 due to a change in the temperature of the surface in contact with the object, or a gradual heating of the coupling body itself does not affect the measurement.

The elapsed time between $T_4$ and $T_5$ will remain completely representative of the thickness of the material without any drift or the necessity for recalibrating the circuit as has been the case in the heretofore known arrangements. Similarly, any mechanical wear and shortening of the physical length of the coupling medium 16 does not affect the accuracy of measurement.

FIGURE 4 is a more detailed electrical circuit diagram of the block diagram per FIGURE 1. The multivibrator 28 comprises mainly two transistors 28A and 28B. The transistor 28A is shorted by a transistor 50 during the time that the capacitor 52 is charged. The capacitor 52 is connected serially with a diode 54. The capacitor 52 receives its charge concurrently with the initial pulse signal applied to the transducer 12. This charge on the capacitor 52 is the inhibit signal and prevents operation of the multivibrator during the initial time cycle. The base resistance of the transistor 50 forms the discharge circuit, and the capacitor and this resistance are dimensioned so that the charge on the capacitor 52 is dissipated by the time the first reflection signal is received at the transducer 12, which signal starts operation of the multivibrator.

The time-to-voltage converter comprises two transistors 30A and 30B, a charging capacitor 56, and a peak detector circuit which comprises a rectifier 58 and a capacitor 60. The capacitor 60 charges to the peak voltage of the timing saw-tooth wave produced by the converter stage. The transistor 62 is an emitter follower circuit and provides isolation to the digital voltmeter 32.

It will be apparent that the above described arrangement is eminently suited for the accurate determination of wall thicknesses of tubes, plates etc. and that the circuit is not affected by changes in the coupling medium. Additionally, the circuit does not depend on good multiple back reflections for measurement with the attendant problems when spurious reflections are encountered. The multivibrator is started only by the first interface reflection and stopped by the next-succeeding reflection signal, thus avoiding any ambiguity of measurement. Also, as is evident the reflection signals received at the respective transducers 12 and 14 are coupled independently of each other, via separate amplifiers and signal paths, to the timing circuit 28. This arrangement avoids the possibility of cross-coupling and the loss of signal resolution between the two reflection signals which may follow each other in quick succession when testing thin sections.

Figure 5:
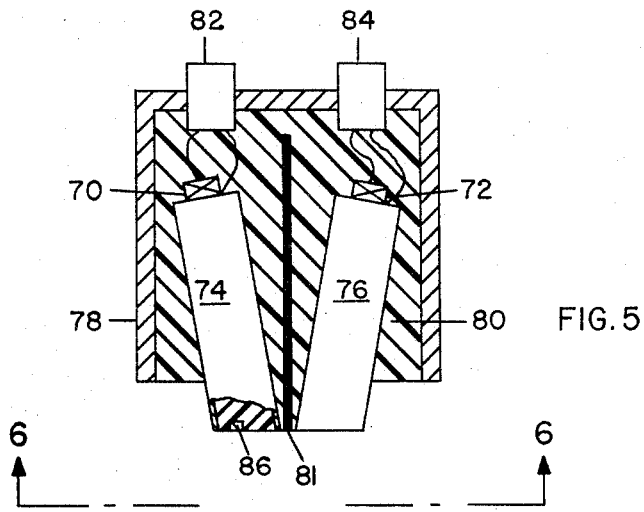
FIGURE 5 is an elevational view, partly in section, of a preferred transducer construction.
Figure 6:
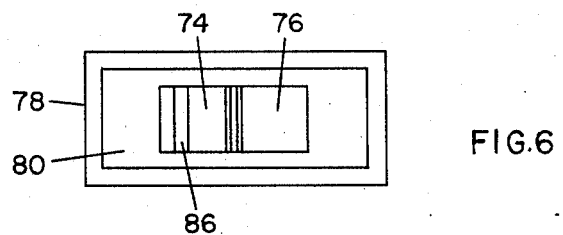
FIGURE 6 is a bottom plan view of the transducer per FIGURE 5 viewed along lines 6—6 in FIGURE 5.

A preferred embodiment of the dual transducer design is shown in FIGURES 5 and 6. Numerals 70 and 72 identify the two piezoelectric transducers which convert electrical energy to acoustic energy and vice versa. Typically, the transducer material is lithium sulfate. Each transducer is mounted to the rear surface of a respective bar, 74 and 76, made of thermoplastic material which constitutes the coupling means and the acoustic delay. Both bars are inclined with respect to each other to provide the focused transducer design described hereinabove. The transducers together with the acoustic coupling means are enclosed in a metallic enclosure 78. Plastic filler material 80 fills the voids. An acoustic barrier material 81, such as cork, prevents crosscoupling between the acoustic signals. Electrical circuit connection to the transducers is established by means of connectors 82 and 84.

A very small piece of metal 86 is disposed at the front surface of the coupling means 74 in order to provide for the generation of a distinct and well defined reference reflection signal when the initial pulse from the transducer 70 leaves the front surface of the coupling means 74 and enters the entrant surface 18 of the object 20. This reference signal, being independent of the degree of coupling between the coupling means 74 and the object, assures actuation of the timing circuit.

The piece of metal, or any other means which provides for a noticeable change in acoustic impedance at the location substantially at the interface between the delay means and the front surface of the object 20, if located at the very end of the coupling means and relatively thin in relation to the length of the coupling means 74, does not measurably affect the accuracy of measurement. Typically, the metal piece 86 is a 0.010 inch thick rod held in a one inch long coupling means. Similarly, the small error in reading which occurs due to a change in temperature of the metal is not significant. The piece 86 is of such small size and located slightly off the main axis of the sonic energy beam so as not to interfere with the transmission of acoustic energy to the object.

What is claimed is:

1. A pulse-echo ultrasonic apparatus for exploring an object comprising:
    a transducer probe comprising a first and a second electro-acoustic transducer disposed substantially in juxtaposition;
    first and second acoustic coupling means associated respectively with said first and second transducers for acoustically coupling each of said transducers through a respective coupling means and a couplant film to the entrant surface of an object to be explored;
    acoustic shielding means disposed between said first and second coupling means for suppressing cross-coupling of acoustic signals traversing said respective coupling means;
    an electrical pulse generator coupled to said first transducer for periodically energizing said first transducer whereby said transducer is caused periodically to transmit an ultrasonic search pulse through said first coupling means into the object;
    electrical timing means coupled to said first and said second transducer for starting a timing cycle responsive to the generation of an electrical signal by said first transducer, said signal being caused by a reflection of ultrasonic energy of the search pulse substantially at the interface between said coupling means and the entrant surface of the object, and to terminate said respective timing cycle responsive to the generation of a subsequent electrical signal by said second transducer, said subsequent signal being caused by a reflection of ultrasonic energy arising as the ultrasonic search pulse intercepts an acoustic discontinuity below the entrant surface, and
    means coupled between said pulse generator and said timing means for inhibiting operation of said timing means when said pulse generator energizes said first transducer.

2. A pulse-echo ultrasonic apparatus as set forth in claim 1, said first and said second electro-acoustic transducer being coupled through separate signal paths to said electrical timing means.

3. A pulse-echo ultrasonic apparatus as set forth in claim 2, each of said signal paths having an amplifier for amplifying the signal from a respective transducer to said timing means.

4. A pulse-echo ultrasonic apparatus as set forth in claim 2, said timing means comprising a bistable multivibrator having a first input connection for receiving the signal from said first transducer and a second input connection for receiving the signal from said second transducer.

5. A pulse-echo ultrasonic apparatus as set forth in claim 4, said bistable multivibrator being coupled to a converter for providing an electrical output signal whose value is commensurate with said time cycle, and a display means coupled for receiving said output signal and providing a numerical display responsive to the value of said output signal.

6. A pulse-echo ultrasonic apparatus as set forth in claim 1, said first and second electrical coupling means delaying the respective acoustic signals passing therethrough by substantially equal lengths of time.

7. A pulse-echo ultrasonic apparatus as set forth in claim 6, said transducers comprising piezoelectric material and said respective coupling means comprising lengths of solid material which thermally insulates said transducers from the object surface.

8. A pulse-echo ultrasonic apparatus for exploring an object comprising:
- a manually operable transducer probe comprising a first and a second electro-acoustic transducer disposed substantially in juxtaposition;
- first and second acoustic bar-type coupling means of equal length and identical material associated respectively with said first and second transducer for acoustically coupling each of said transducers through a respective coupling means and a couplant film to the entrant surface of an object to be explored;
- acoustic shielding means disposed between said first and said second coupling means for suppressing cross-coupling of acoustic signals traversing said respective coupling means;
- an electrical pulse generator coupled to said first transducer for periodically energizing said first transducer whereby said transducer is caused periodically to transmit an ultrasonic search pulse through said first coupling means into the object;
- electrical timing means which include a bistable multi-vibrator coupled through separate signal paths to said first and to said second transducer for starting a timing cycle responsive to the generation of an electrical signal by said first transducer, said signal being caused by a reflection of ultrasonic energy substantially at the interface between said coupling means and the entrant surface of the object, and to terminate said respective timing cycle responsive to the generation of a subsequent electrical signal by said second transducer, said subsequent signal being caused by a reflection of ultrasonic energy arising as the ultrasonic search pulse intercepts an acoustic discontinuity below the entrant surface;
- means coupled to said timing means for producing a signal having an amplitude responsive to the duration of said timing cycle and for displaying a numerical value commensurate with said amplitude, and
- means coupled between said pulse generator and said timing means for inhibiting operation of said timing means when said pulse generator energizes said first transducer.

9. A manually operable dual transducer assembly for pulse-echo testing comprising:
- a pair of electro-acoustic transducers disposed substantially in side-by-side relation;
- a pair of elongated coupling members for transmitting acoustic energy between said transducers and the surface of an object;
- each of said transducers coupled to one first end of a respective coupling member, and the opposite second end of said respective coupling members adapted to be coupled to the surface of an object to be tested;
- acoustic shielding means disposed between said coupling members for suppressing cross-coupling of acoustic signals traversing said members, and
- a means having an acoustic impedance different from that of said coupling members disposed substantially at said second end of one of said coupling members and disposed to intercept a portion of the acoustic energy propagated from the associated transducer through such coupling member into the object, whereby to cause a reference reflection signal to be received by said associated transducer.

10. A manually operable dual transducer assembly for pulse-echo testing as set forth in claim 9 wherein said coupling members and transducers are mounted so that the acoustic energy transmitted into an object and the acoustic energy reflection signal received therefrom intersect at an acute angle.

11. A manually operable dual transducer assembly for pulse-echo testing as set forth in claim 9 wherein said coupling members comprise polymeric plastic material and said means having an acoustic impedance different from that of said coupling member is metal.

12. A manually operable dual transducer assembly for pulse-echo testing comprising:
- a housing supporting a pair of electro-acoustic transducers disposed substantially in side-by-side relation, and a pair of elongated heat insulating coupling members for transmitting acoustic energy between said transducers and the surface of an object;
- each of said transducers coupled to one first end of a respective coupling member, and the opposite second end of said respective coupling members adapted to be coupled to the surface of an object to be tested;
- acoustic shielding means disposed between said coupling members for suppressing cross-coupling of acoustic signals traversing said members from one end to the opposite end, and
- a means having an acoustic impedance greater than that of said coupling members disposed substantially at said second end of one of said coupling members and disposed to intercept a portion of the acoustic energy propagated from the associated transducer through such coupling member into the object, whereby to cause a reference reflection signal to be received by said associated transducer.

References Cited

UNITED STATES PATENTS

| | | | |
|---|---|---|---|
| 2,819,613 | 1/1958 | Neiley | 73—67.7 |
| 3,273,111 | 9/1966 | Parenti | 73—67.7 |
| 3,320,797 | 5/1967 | Tajiri et al. | 73—67.7 |
| 3,008,332 | 11/1961 | Charbonnier et al. | 73—67.8 XR |
| 3,169,393 | 2/1965 | Stebbins | 73—67.9 |
| 3,262,306 | 7/1966 | Henry | 73—67.9 |
| 3,350,923 | 11/1967 | Cross | 73—67.8 |

FOREIGN PATENTS

| | | |
|---|---|---|
| 842,653 | 7/1960 | Great Britain. |
| 978,183 | 12/1964 | Great Britain. |

OTHER REFERENCES

Goldman, R., Ultrasonic Technology, Reinhold Pub. Corp., New York, 1962, pp. 263–267.

RICHARD C. QUEISSER, Primary Examiner

JOHN P. BEAUCHAMP, Assistant Examiner

U.S. Cl. X.R.

73—67.9